Inventor:—
W. Vincent Thelander,
Andrew F. Wintercorn
Atty.

June 8, 1948.  W. V. THELANDER  2,442,787
CLUTCH ACTUATING MECHANISM
Original Filed Dec. 12, 1941  2 Sheets-Sheet 2

Inventor:-
W. Vincent Thelander
Andrew F. Wintercorn
Atty.

Patented June 8, 1948

2,442,787

UNITED STATES PATENT OFFICE 2,442,787

CLUTCH ACTUATING MECHANISM

W. Vincent Thelander, Auburn, Ind., assignor to Dana Corporation, Toledo, Ohio, a corporation of Virginia Original application December 12, 1941, Serial No. 422,614. Divided and this application July 3, 1944, Serial No. 543,341

9 Claims. (Cl. 192—48)

1

This application is a division of my copending application Serial No. 422,614, filed December 12, 1941, now Patent #2,379,024, June 26, 1945.

This invention relates to friction clutches, and has particular reference to an improved clutch actuating mechanism which although especially designed for use with two-way clutches having two disks adapted to have drive transmitted thereto selectively is also adapted for use with single disk clutches.

A salient feature of the present invention consists in the provision of spring means outside the clutch proper and, hence, isolated from the parts subject to heating in the operation of the clutch, the said spring means cooperating with clutch actuating levers so as to apply spring pressure to the pressure plate, said spring means affording substantially constant pressure on the pressure plate when the clutch is engaged regardless of wear on the clutch disk facings and permitting movement past dead-center of the toggle linkage operating the actuating levers, whereby the clutch is automatically held in engaged position under spring pressure until manually released.

The invention is illustrated in the accompanying drawings, in which—

Similar reference numerals are applied to corresponding parts throughout the views.

Figure 1:
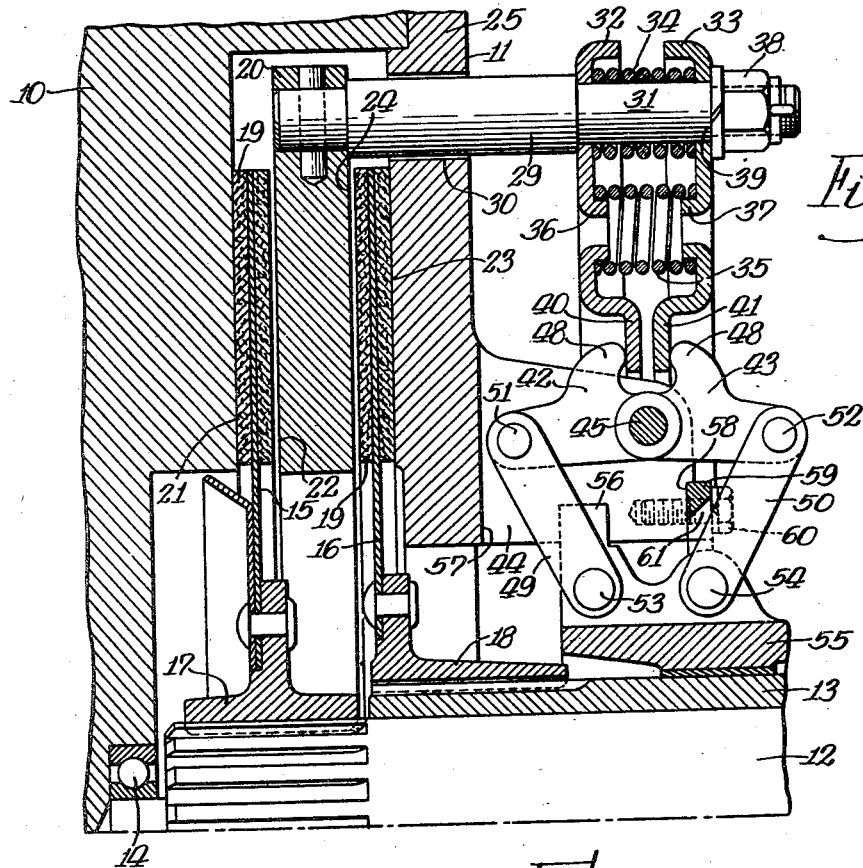
Figure 1 is a longitudinal section through a clutch embodying the novel clutch actuating mechanism of my invention, half of the section being omitted to conserve space and permit showing the parts on a larger scale.
Figure 2:
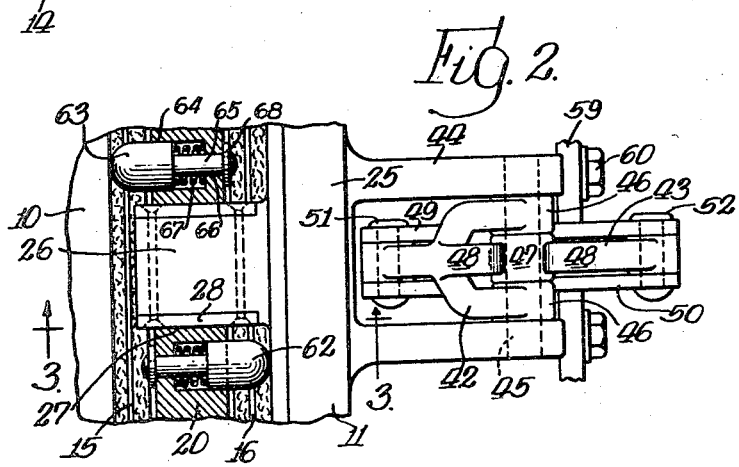
Figs. 2 and 3 are fragmentary sectional details showing other portions of the clutch, Fig. 3 being a sectional detail on the line 3—3 of Fig. 2.
Figure 3:
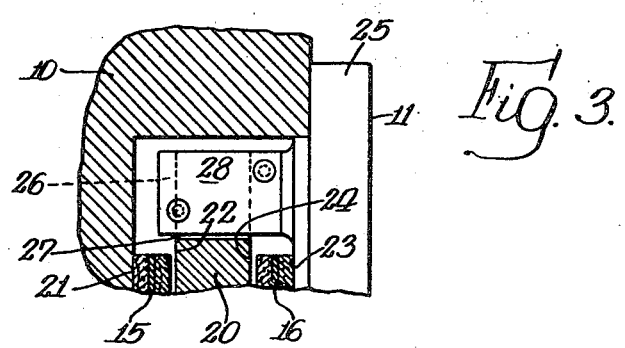

Referring first to Figs. 1 to 3, the reference numeral 10 designates the flywheel of an engine, and 11 the back plate thereon. 12 is a driven shaft extending rearwardly from the flywheel adapted for direct connection with the propeller shaft or to be extended into the front end of the gear box of a transmission, and 13 is a quill surrounding the shaft and serving as an auxiliary driven member, the shaft 12 being for high ratio drive and the quill 13 for low ratio drive, as will soon appear. The shaft 12 has the usual pilot bearing 14 supporting the front end thereof at the center of the flywheel 10. 15 and 16 are

2 clutch disks, the disk 15 having its center hub 17 splined on the front end of the shaft 12 to transmit drive from the flywheel to the shaft when the disk 15 is engaged, and the disk 16 having its hub 18 splined on the front end of the quill 13 to transmit drive from the flywheel to the quill when the disk 16 is engaged. At 19 are shown the usual pads or facings on the clutch disks, and at 20 is indicated a pressure plate between the two disks, adapted when moved forwardly to engage disk 15 with the driving face 21 on the back of the flywheel and the companion driving face 22 on the front of the pressure plate. The pressure plate is also movable rearwardly for engagement with disk 16 to cause engagement thereof with the driving face 23 on the back plate 11 and the companion driving face 24 on the back of the pressure plate. The latter is suitably cast like the flywheel and back plate and the faces 21—24 are accurately machined on these cast parts to cause smooth clutch engagement. The back plate is suitably bolted to the flywheel by means of its marginal flange portion 25 and has a plurality of drive lugs 26 cast integral therewith and projecting forwardly therefrom in circumferentially spaced relation for slidable driving engagement in radial notches 27 in the periphery of the pressure plate 20. Hardened wear plates 28 are riveted onto opposite sides of the lugs 26, as shown, to minimize wear. The pressure plate has a plurality of posts 29 rigidly attached to and projecting rearwardly from the peripheral portion thereof in circumferentially spaced relation. These posts extend freely through holes 30 provided in the back plate, and have reduced rear end portions 31 for slidably mounting stamped sheet metal rings 32 and 33, through which the reduced end portions 31 of the posts project, as shown. The reduced end portions 31 of the posts also serve as supports for coiled compression springs 34 which surround these end portions 31 and have engagement at their opposite ends with the rings 32 and 33. Additional coiled compression springs 35 are interposed between the rings and supported at their opposite ends by hollow cylindrical bosses 36 and 37 struck inwardly from the rings. The springs 34 and 35 are all preloaded when nuts 38 threaded on the further reduced ends of the posts 29 are tightened against the shoulders 39. The rings 32 and 33 have annular flanges 40 and 41 on their inner peripheries in concentric relation to the rings and back plate and pressure plate, and these flanges are in axially spaced relation so that the clutch actuating levers 42 and 43 for selective engagement of the clutch in either of the two operative positions of the pressure plate can further compress the springs to have the clutch engaged under increased spring pressure in either of the two aforesaid positions of the pressure plate. The levers 42 and 43, of which there will preferably be six sets in equally circumferentially spaced relation with respect to the back plate, are mounted in paired relation, as shown in Fig. 2, between lugs 44 on common pivot pins 45, each of the levers 42 being bifurcated, as indicated, to provide two bearings 46 to receive therebetween the single bearing 47 of the associated lever 43. Fingers 48 on the levers 42 and 43 project radially outwardly and have rounded outer end portions for sliding engagement with the flanges 40 and 41, as clearly appears in Fig. 1, these fingers moving in an endwise direction relative to the posts 29 in the oscillatory movement of the levers 42 and 43 to move the rings 32 and 33 forwardly or rearwardly depending upon the direction of movement of the throw-out collar 55. Toggle links 49 and 50 are pivotally connected to the ends of the levers 42 and 43 remote from the pivot pin 45, as at 51 and 52, and these links are pivotally connected, as at 53 and 54, to the manually reciprocable throw-out collar 55. There are, of course, as many sets of toggle links 49 and 50 as there are levers 42 and 43. The pivots 53 and 54 are much closer together than the pivots 51 and 52 so that when the collar 55 is moved forwardly from the neutral position shown the links 49 move the levers 42 in a clockwise direction toward operative position as the pivots 53 move toward a plane through the pivots 51 normal to the axis of rotation, the levers 43 meanwhile being retracted from operative relationship to the flange 41 by the links 50. On the other hand in the rearward movement of the collar 55 from the neutral position shown, the links 50 move the levers 43 in a counterclockwise direction toward operative position as the pivots 54 move toward a plane through the pivots 52 normal to the axis of rotation, the levers 42 meanwhile being retracted from operative position to the flange 40 by the links 49. In the initial movement of the levers 42 toward operative position, the pressure plate 20 is brought into engagement with the clutch disk 16, and in the further movement the ring 32 is moved toward the ring 33 to compress the springs 34 and 35, thereby engaging the clutch disk 16 under a pressure substantially above the preload pressure of the springs. In the initial movement of the levers 43 toward operative position, the pressure plate 20 engages the clutch disk 15, and thereafter in the further movement of the levers the ring 33 is moved toward the ring 32 so as to further compress the springs 34 and 35 and engage the clutch disk under a pressure substantially above the preload pressure. The present clutch is of the "over-center" type and provision is accordingly made for movement of the throw-out collar 55 past the dead center positions, both in forward movement from the neutral position and in rearward movement from the neutral position. Thus, for example, in the forward movement of the collar 55 there is maximum compression of the springs when the pivots 53 are in dead center relationship to the pivots 51, namely, when said pivots are in the same plane with the pivots 51 normal to the axis of rotation, and at that point the lug 56 on the collar 55 is in closely spaced relation to the back face 57 on the back plate and is arranged to be brought into engagement with said face by the slight amount of additional forward movement of the collar 55 necessary, the toggle links 49 in that slight additional movement being moved "over center." There is, therefore, no appreciable reduction in spring pressure in the movement past center, but the spring pressure is made effective to hold the throw-out collar resiliently in the extreme forward position so that the clutch is not apt to be accidentally disengaged. Generally speaking, the same operation occurs in the rearward movement of the collar 55, the springs having maximum compression when the pivots 54 are in dead center relationship to the pivots 52, and the lug 56 being in closely spaced relation under those conditions to the front face 58 of a ring 59 carried on the back plate. Slight further rearward movement of the collar 55 under those conditions brings the lug 56 into engagement with the ring 59 and the toggle links 50 and is thereby moved "over center." Here again it is clear that there is very little reduction in spring pressure as a result of the movement over center and the spring pressure is made effective to hold the collar 55 resiliently in the extreme engagd position to avoid accidental disengagement of the clutch. The ring 59 is fastened to the lugs 44 by means of screws 60 and, as indicated at 61, is cut away on the inner peripheray to provide the required operating clearance for the links 50. When the collar 55 is in the neutral position shown, spring pressed plungers 62 and 63 mounted in the peripheral portion of the pressure plate 20 are effective to hold the collar yieldingly in that position so as to prevent accidental engagement of the clutch, the plungers 62 serving yieldingly to prevent rearward movement of the pressure plate by light frictional contact with the inner face 23 of the back plate, and the plungers 63 serving likewise to prevent forward movement of the pressure plate by light frictional contact with the back face 21 of the flywheel. There are preferably three plungers 62 in equally circumferentially spaced relation relative to the pressure plate 20 and three plungers 63 in equally circumferentially spaced relation relative to the pressure plate 20. These plungers are preferably disposed in pairs on opposite sides of the notches 27 in the pressure plate, as illustrated in Fig. 2, there being preferably three drive lugs 26 on the back plate to cooperate with three equally circumferentially spaced notches 27 in the periphery of the pressure plate. Each of the plungers 62 and 63 has a loose working fit in a bore 64, as shown in Fig. 2, and has a reduced stem portion 65 reciprocable freely in a hole 66 communicating with the bore. A light coiled compression spring 67 surrounds the stem 65 in the bore 64 and acts to hold the plunger normally in the extended position. A washer 68 riveted on the outer end of the stem 65 limits the outward movement of the plunger.

It should be understood that although I have shown a clutch having two disks 15 and 16 adapted to be driven selectively, the clutch actuating mechanism of my invention is also applicable to a clutch having only the one disk 15. Forward movement of the throw-out collar 55 by means of a manually operable clutch pedal or lever (not shown) causes engagement of the disk 16. On the other hand, when the collar 55 is moved rearwardly the disk 15 is engaged. The springs 34 and 35 in addition to providing resilient engagement in either a single disk or two disk clutch so that close adjustment is not required, even though the clutch is of the over-center type, provide substantially constant pressure and accordingly non-slipping engagement regardless of the usual wear on the clutch facings 19. In addition, the springs act to hold the throw-out collar 55 resiliently in either engaged position, thus avoiding likelihood of accidental disengagement of the clutch. The plungers 62 and 63 insure prompt disengagement of the pressure plate from the clutch disks when the throw-out collar 55 is moved to neutral position for disengagement of the clutch, and these plungers hold the pressure plate yieldingly in the mid-position shown in Figs. 1 and 2 out of engagement with both disks so that there is no likelihood of accidental engagement of the clutch.

Figure 4:
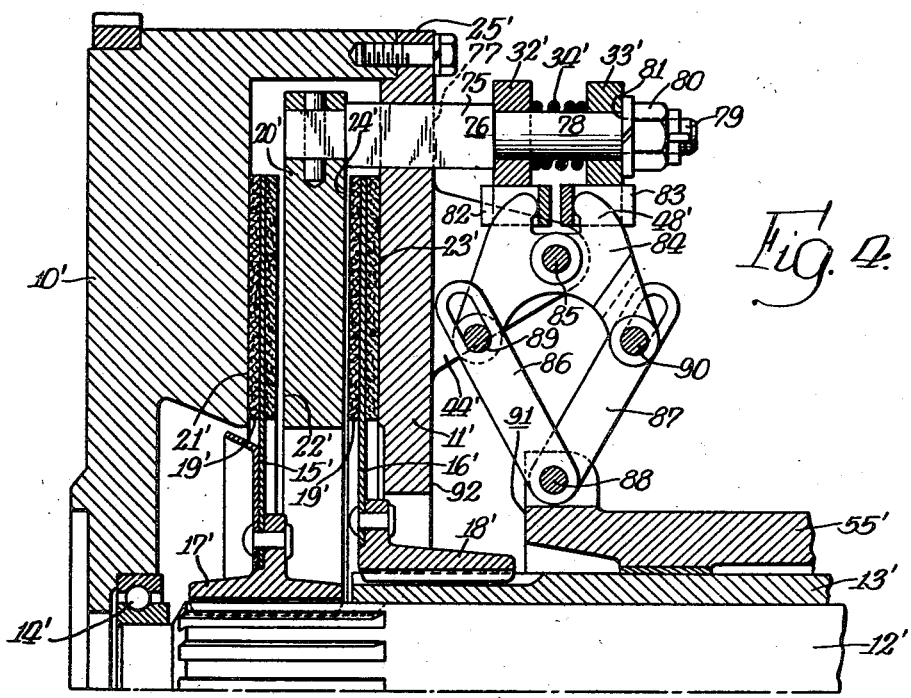
Fig. 4 is a section similar to Fig. 1 illustrating another clutch embodying a clutch actuating mechanism of modified or alternative construction.

The clutch shown in Fig. 4 is similar to that just described, and in this clutch the parts that correspond to parts in the other clutch have been numbered correspondingly, using prime numbers. The posts 75 rigid with and projecting rearwardly from the pressure plate 20' have flat faces 76 on the opposite sides thereof and have a close working fit in correspondingly shaped holes 77 provided in the back plate 11' to provide a sliding driving connection between the pressure plate and back plate. The posts 75, of which there are preferably six in equally circumferentially spaced relation relative to the back plate, have reduced cylindrical end portions 78, which are further reduced at their extremities 79 and threaded to receive nuts 80 to hold the cast rings 32' and 33' in place on the posts with coiled compression springs 34' compressed therebetween, similarly as in the other clutch. When the washers under the nuts 80 are tightened against the shoulders 81, a predetermined preload pressure is established. Hardened steel stirrups 82 and 83 are set in the cast rings 32' and 33', respectively, for cooperation with actuating forks 84 pivoted, as at 85, between lugs 44' cast integral with and projecting rearwardly from the back plate 11'. The fingers 48' on each fork are engaged in the associated stirrups 82 and 83 so that when the fork 84 is oscillated in one direction or the other, the pressure plate 20' is moved correspondingly and the springs 34' and such other springs as may be provided between the rings 32' and 33', like the springs 35 in Fig. 1, are compressed beyond the preload pressure after the pressure plate has engaged the clutch disk 15' or 16', as the case may be. The fork 84 is arranged to be oscillated in either direction from the central neutral position shown by reciprocation of the throw-out collar 55' through the lost motion link connections shown, links 86 and 87 being pivotally connected at one end on a common pivot pin 88 to the throw-out collar and having pin and slot connections at their other ends with the fork 84, as indicated at 89 and 90. The pressure plate 20', it will be understood, is equipped with spring pressed plungers like those shown in the other clutch, so as to hold the pressure plate yieldingly in the middle neutral position and avoid likelihood of accidental engagement of the clutch. The forward end 91 of the throw-out collar is arranged to engage the back face 92 of the back plate when the throw-out collar is moved to an extreme forward position where the pivots 88 are moved slightly past dead center relationship to the pivots 89, similarly as in the over-center movement described in the other clutch. Similar provision may be made for limiting movement of the throw-out collar past the dead center position in its rearward movement as described in the other clutch. In that way the clutch is held engaged resiliently and there is avoided likelihood of accidental disengagement, and, of course, the springs 34' and such other springs as may be provided between the rings 32' and 33' afford substantially constant engaging pressure to compensate for wear in the operation of the clutch, similarly as in the other clutch. The operation of this clutch is so closely similar to the operation of the other clutch no further description is considered necessary.

It is believed the foregoing description conveys a good understanding of the objects and advantages of my invention. The appended claims have been drawn to cover all legitimate modifications and adaptations.

I claim:

1. In a friction clutch, comprising a flywheel having a back plate, a clutch disk, a pressure plate for frictionally engaging the clutch disk, supports extending from the pressure plate to a plane behind the back plate, springs and spring caging ring means therefor slidably mounted on said supports, and over-center clutch actuating lever means pivotally mounted on the back plate and operatively associated with said ring means to move the pressure plate to engaged position and engage the clutch resiliently under pressure of said springs, the clutch being locked resiliently by said springs in engaged position when said lever means has been moved past a predetermined dead center position.

2. In a friction clutch, comprising a flywheel having a back plate, a clutch disk, a pressure plate for frictionally engaging the clutch disk, supports extending from the pressure plate to a plane behind the back plate, a plurality of springs, cage means for said springs movably mounted on said supports and supporting said springs thereon in circumferentially spaced relation, a throw-out member reciprocable toward and away from the back plate, and over-center lever means pivoted relative to the back plate and operatively connecting said throw-out member and said cage means to move the latter so as to engage the clutch and transmit engaging pressure through said springs to the pressure plate and lock the clutch in engaged position upon movement of said lever means past a dead-center position.

3. In a friction clutch comprising a fly-wheel having a back plate, a clutch disk, a pressure plate for frictionally engaging the clutch disk having supports thereon for spring means extending to a plane behind the back plate, spring means caged in preloaded condition on the supports, and over-center type positive acting mechanical clutch actuating means for moving said supports and the pressure plate to engage the clutch disk resiliently by compression of the spring means above the preload pressure and lock the clutch resiliently in engaged condition under the same spring pressure.

4. In a friction clutch comprising a fly-wheel having a back plate, a clutch disk, a pressure plate for frictionally engaging the clutch disk, a pair of ring members in concentric relation to said plates and guided for a limited axial movement with respect to the pressure plate and adapted to hold and compress a compressible resilient means caged on said ring members, a throw-out member reciprocable toward and away from the back plate, and over-center lever means operatively connecting said throw-out member and said ring members so as to engage the clutch resiliently and lock the clutch in engaged position.

5. In a friction clutch comprising a fly-wheel having a back plate, a clutch disk, a pressure plate for frictionally engaging the clutch disk having ring supporting means thereon, a pair of rings supported by said means in concentric relation to said plates and guided on said supporting means for a limited axial movement with respect to the pressure plate and adapted to support springs, a plurality of springs supported on said rings in circumferentially spaced relation, a throw-out member reciprocable toward and away from the back plate, and over-center lever means providing a lost motion operating connection between said throw-out member and said rings to permit resilient engagement of the clutch and also permit locking of the clutch in engaged position.

6. In a friction clutch comprising a fly-wheel having a back plate, a clutch disk, a pressure plate for frictionally engaging the clutch disk having ring supporting means thereon, a pair of ring members supported by said means on the pressure plate in concentric relation thereto and guided on said supporting means for a limited axial movement with respect to the pressure plate and adapted to support springs, a plurality of springs supported in circumferentially spaced relation to said rings, and lever means mounted for pivotal movement relative to the back plate and operatively engaging the rings to move the pressure plate relative to the back plate to engage the clutch disk and load the aforesaid springs so as to engage the clutch resiliently.

7. In a friction clutch comprising a fly-wheel having a back plate, a clutch disk, a pressure plate for frictionally engaging the clutch disk having ring supporting means thereon, a pair of rings members supported by said means on the pressure plate in concentric relation thereto and guided on said supporting means for a limited axial movement with respect to the pressure plate and adapted to support springs, a plurality of springs supported in circumferentially spaced relation to said rings, positive acting lever means mounted for pivotal movement relative to the back plate and operatively engaging said rings to move the pressure plate relative to the back plate to engage the clutch disk and compress the aforesaid springs to engage the clutch resiliently, a throw-out member guided for movement toward and away from the back plate, and lever actuating means carried on said throw-out member and arranged upon movement thereof from a neutral position to move said lever means to an extreme position in which the clutch is engaged resiliently and locked in such condition so long as said throw-out member is not returned to neutral position.

8. In a friction clutch comprising a fly-wheel having a back plate, a clutch disk, a pressure plate for frictionally engaging the clutch disk having ring supporting means thereon, a pair of ring members supported by said means on the pressure plate in concentric relation thereto and guided on said supporting means for a limited axial movement with respect to the pressure plate and adapted to support springs, a plurality of springs supported in circumferentially spaced relation to said rings, positive acting lever means mounted for pivotal movement relative to the back plate and operatively engaging said rings to move the pressure plate relative to the back plate to engage the clutch disk and compress the aforesaid springs to engage the clutch resiliently, a throw-out member guided for movement toward and away from the back plate, and means providing a lost motion operating connection between said throw-out member and said lever means.

9. In a friction clutch comprising a flywheel having a back plate, a clutch disk, a pressure plate for frictionally engaging the clutch disk having rearward projections rigid therewith extending to a plane behind the back plate, spring means caged in compressed condition on said projections behind and in spaced relation to the back plate, and positive acting mechanical clutch actuating means pivoted with respect to the back plate and including portions movable endwise relative to said projections to move said spring means toward the back plate, whereby first to engage the clutch disk more or less positively and thereafter further compress said spring means so that the final engagement is under increased spring pressure.

W. VINCENT THELANDER.

REFERENCES CITED

The following references are of record in the file of this patent:

UNITED STATES PATENTS

| Number | Name | Date |
| --- | --- | --- |
| 1,791,016 | Sundh | Sept. 14, 1943 |
| 1,861,080 | Chorlton | May 31, 1932 |
| 2,249,043 | Root | July 15, 1941 |
| 2,251,367 | Miller | Aug. 5, 1941 |
| 2,259,784 | Spase | Oct. 21, 1941 |
| 2,329,205 | Knox | Sept. 14, 1943 |